(12) United States Patent
Li et al.

(10) Patent No.: US 12,335,181 B2
(45) Date of Patent: Jun. 17, 2025

(54) SYSTEM AND METHOD FOR MULTI-SIM

(71) Applicant: ZTE CORPORATION, Guangdong (CN)

(72) Inventors: Wenting Li, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 419 days.

(21) Appl. No.: 17/970,323

(22) Filed: Oct. 20, 2022

(65) Prior Publication Data
US 2023/0070472 A1   Mar. 9, 2023

Related U.S. Application Data

(63) Continuation of application No. PCT/CN2020/107317, filed on Aug. 6, 2020.

(51) Int. Cl.
H04L 5/00      (2006.01)
H04W 8/20     (2009.01)

(52) U.S. Cl.
CPC .......... *H04L 5/0048* (2013.01); *H04L 5/0032* (2013.01); *H04W 8/20* (2013.01)

(58) Field of Classification Search
CPC .... H04L 5/0032; H04L 5/0048; H04W 8/183; H04W 8/20; H04W 88/06; H04W 68/02; H04W 8/24
See application file for complete search history.

(56) References Cited

U.S. PATENT DOCUMENTS

| 10,623,946 B1* | 4/2020 | Kumar | H04W 76/16 |
| 2012/0190362 A1* | 7/2012 | Subbarayudu | H04W 76/28 |
| | | | 455/435.1 |
| 2014/0274047 A1 | 9/2014 | Dhanda et al. | |

(Continued)

FOREIGN PATENT DOCUMENTS

| CN | 103416101 A | 11/2013 |
| CN | 103596269 A | 2/2014 |

(Continued)

OTHER PUBLICATIONS

Extended European Search Report on EP 20948593.7 mailed Jun. 1, 2023 (15 pages).

(Continued)

*Primary Examiner* — Brian D Nguyen
(74) *Attorney, Agent, or Firm* — Foley & Lardner LLP

(57) ABSTRACT

A system and method for detecting the paging of another Subscriber when one Subscriber is in a connected state. The system and method includes configuring, by a wireless communication device, a first subscriber of the wireless communication device into a connection state with a first wireless communication node; configuring, by the wireless communication device, a second subscriber of the wireless communication device into an idle state or an inactive state, wherein the second subscriber is associated with a second wireless communication node; determining, by the wireless communication device, Multi-Subscriber Identification Module (SIM) assistance Information (MAI) that is associated with the second subscriber of the first wireless communication node; and transmitting, by the wireless communication device, the MAI to the first wireless communication node.

14 Claims, 11 Drawing Sheets

(56) References Cited

U.S. PATENT DOCUMENTS

2015/0005018 A1    1/2015  Klatt
2021/0014667 A1*  1/2021  Lovlekar ............... H04W 88/06
2022/0240213 A1*  7/2022  Ly ....................... H04W 68/005

FOREIGN PATENT DOCUMENTS

| CN | 106535331 A | 3/2017 | |
|---|---|---|---|
| CN | 110495208 A | 11/2019 | |
| CN | 110574466 A | 12/2019 | |
| CN | 110677900 A | 1/2020 | |
| CN | 111278106 A | 6/2020 | |
| CN | 111294986 A | 6/2020 | |
| EP | 2 512 195 A1 | 10/2012 | |
| EP | 3 982 696 A1 | 4/2022 | |
| WO | WO-2020063559 A1 * | 4/2020 | ........... H04L 5/0032 |
| WO | WO-2020247043 A1 * | 12/2020 | ........... H04W 12/45 |

OTHER PUBLICATIONS

Sony: "Solution for KI#3: Receiving Paging Occasions in other Networks", 3GPP Draft; S2-1911145, SA WG2 Meeting #136, Reno, US, Nov. 8, 2019 (4 pages).
First Korean Office Action on KR 10-2022-7036623, mailed Apr. 29, 2024 (8 pages, including English translation).
First Office Action for CN Appl. No. 202080099732.4, dated Oct. 28, 2024 (with English translation, 31 pages).
International Search Report and Written Opinion for PCT Appl. No. PCT/CN2020/107317, mailed Apr. 26, 2021 (9 pages).
Vivo: "Report of phase 1 Muti-SIM email discussion" 3GPP TSG-RAN WG Meeting #85; RP-191898; Sep. 20, 2019; Newport Beach, USA (36 pages).

* cited by examiner

```
UEAssistanceInformation message

UEAssistanceInformation ::=        SEQUENCE {
    criticalExtensions             CHOICE {
        ueAssistanceInformation        UEAssistanceInformation-IEs,
        criticalExtensionFuture        SEQUENCE   {}
    }
}

UEAssistanceInformation-IEs ::= SEQUENCE {
    ...
    nonCriticalExtension            UEAssistanceInformation-v16xy-IEs       OPTIONAL}

UEAssistanceInformation-v16xy-Ies ::= SEQUENCE {
    ...
    nonCriticalExtension            UEAssistanceInformation-v17xy-IEs       OPTIONAL}

UEAssistanceInformation-v17xy-IES ::= SEQUENCE {
    multiSIMAssistance              MultiSIMAssistance              OPTIONAL,
    nonCriticalExtension            SEQUENCE    {}}
```

FIG. 4

```
MultiSIMAssistance ::= SEQUENCE {
    dRX-Preference DRX-Preference;
}

Then the existing DRX-Preference strucutre in REL16 can be reused.
DRX-Preference ::= SEQUENCE {
    preferredDRX-InactivityTimer    ENUMERATED {
        ms0, ms1, ms2, ms3, ms4, ms5, ms8, ms10, ms20, ms30, ms40, ms50, ms60, ms80, ms100, ms200, ms300,
        ms500, ms750, ms1280, ms1920, ms2560, spare8, spare7, spare6, spare5, spare4, spare3, saper2, spare1}
        OPTIONAL, preferredDRX-LongCycle    ENUMERATED {
        ms10, ms20, ms32, ms40, ms60, ms64, ms70, ms80, ms128, ms160, ms256, ms320, ms512, ms640, ms1024,
        ms1280, ms2048, ms2560, ms5120, ms10240, spare12, spare11, spare10, spare9, spare8, spare7, spare6, spare5,
        spare4, spare3, spare2, spare1 } OPTIONAL, preferredDRX-ShortCycle    ENUMERATED {
        ms2, ms3, ms4, ms5, ms6, ms7, ms8, ms10, ms14, ms16, ms20, ms30, ms32, ms35, ms40, ms64, ms80, ms128,
        ms160, ms256, ms320, ms512, ms640, spare9, spare8, spare7, spare6, spare5, spare4, spare3, spare2, spare1 }
        OPTIONAL, preferredDRX-ShortCycleTimer INTEGER (1..16)    OPTIONAL
}
```

FIG. 5

```
MultiSIMAssistance ::= SEQUENCE {
    sfn-OffsetResult         INTEGER (0..1023),  OPTIONAL
    frameBoundaryOffsetResult INTEGER (-30720..30719), OPTIONAL
    startSFN                 INTEGER (0..9),
    startFN                  INTEGER (0..1023)
    subcarrierSpacing        ENUMERATED {kHz15, kH30, kHz60, kHz120, kHz240, spare3, spare2, spare1}
    startSymbol              INTEGER (0..13),
    Duration                 INTEGER (1..maxValue),
    period                   ENUMERATED {rf32, rf64, rf128, rf256}
}
``` sfn-OffsetResult
Indicates the SFN difference between the cell of network 2/SIM2 and the cell of the Network1/SIM1 as an integer value according to TS [2].

frameBoundaryOffsetResult
Indicates the frame boundary difference between the cell of network 2/SIM2 and the cell of the Network1/SIM1 as an integer value according to [2].

startSFN
the Start sub-frame number of the TDM Gap, which is based on the timing of the network that the UE need to detect paging startFN
the start Frame Number of the TDM Gap, which is based on the timing of the network that the UE need to detect paging subcarrierSpacing
The subcarrierSpacing of the network of the TDM Gap, which is based on the timing of the network that the UE need to detect paging startSymbol
the start symbol of the TDM Gap, which is based on the timing of the network that the UE need to detect paging

Duration
the duration in symbols of the TDM Gap

Period
the period of the TDM Gap

```
HardoverPreparationInformation message

HandoverPreparationInformation ::=    SEQUENCE {
    criticalExtensions              CHOICE {
        c1                              CHOICE {
            handoverPreparationInformation    HandoverPreparationInformation-IEs,
            spare3 NULL, spare2 NULL, spare1 NULL
        },
        criticalExtensionsFuture        SEQUENCE {}
    }
}

HandoverPreparationInformation-IEs ::= SEQUENCE {
    ue-CapailityRAT-List    UE-CapabilityRAT-ContainerList,
    sourceConfig            AS-Config           OPTIONAL, -- Cond HO
    rrm-Config              RRM-Config          OPTIONAL,
    as-Context              AS-Context          OPTIONAL,
    nonCriticalExtension    SEQUENCE {}         OPTIONAL
}

AS-Config ::=           SEQUENCE {
    multiAssistantInfo      MultiSIMAssistance  Optional,
}
```

FIG. 8

```
900 ──▶
┌─────────────────────────────────────────────────────────────────────────────┐
│ MultiSIMAssistance    ::= SEQUENCE{                                         │
│                                                                             │
│        dRX-Preference          DRX-Preference  OPTIONAL,                    │
│                                                                             │
│        reducedCap              ReducedCap      OPTIONAL                     │
│ }                                                                           │
│                                                                             │
│ ReducedCap   ::=               CHOICE{                                      │
│                                                                             │
│        capID                   INTEGER  (1..maxValue),                      │
│                                                                             │
│        reducedRadioCap         ReducedRadioCap                              │
│                                                                             │
│   }                                                                         │
│                                                                             │
│ ReducedRadioCap: := SEQUENCE {                                              │
│                                                                             │
│   reduceMaxCCs                 ReducedMaxCCs           OPTIONAL,            │
│                                                                             │
│      reducedMaxBW-FR1          ReducedMaxBW-FRx        OPTIONAL,            │
│                                                                             │
│      reducedMaxBW-FR2          ReducedMaxBW-FRx        OPTIONAL,            │
│                                                                             │
│      reducedMaxMIMO-LayersFR1  SEQUENCE {                                   │
│                                                                             │
│         reducedMIMO-LayersFR1-DL      MIMO-LayersDL,                        │
│                                                                             │
│         reducedMIMO-LayersFR1-UL      MIMO-LayersUL                         │
├─────────────────────────────────────────────────────────────────────────────┤
│      } OPTIONAL,                                                            │
│                                                                             │
│      reducedMaxMIMO-LayersFR2   SEQUENCE {                                  │
│                                                                             │
│         reducedMIMO-LayersFR2-DL    MIMO-LayersDL,                          │
│                                                                             │
│         reducedMIMO-LayersFR2-UL    MIMO-LayersUL                           │
│                                                                             │
│      } OPTIONAL,                                                            │
│                                                                             │
│      ...                                                                    │
│                                                                             │
│ }                                                                           │
├─────────────────────────────────────────────────────────────────────────────┤
│ dRX-Preference: Indicate the requested TDM Gap Info                         │
├─────────────────────────────────────────────────────────────────────────────┤
│ reduceCap: indicate the reduced UE radio capability, the current network can go on the data transmission at the TDM Gap │
│ with this reduced capability. If it's absent, it means the UE doesn't support the reduced Gap method, the UE can't monitor │
│ the paging on the other network and Tx/Rx data on this network at the same time. │
└─────────────────────────────────────────────────────────────────────────────┘
```

configuring, by a wireless communication device, a first subscriber of the wireless communication device into a connection state with a first wireless communication node
1102

configuring, by the wireless communication device, a second subscriber of the wireless communication device into an inactive state or an idle state, wherein the second subscriber is associated with a second wireless communication node
1104

receiving, by the wireless communication device, a packet comprising a paging message for the second subscriber through the first wireless communication node
1106

FIG. 11

SYSTEM AND METHOD FOR MULTI-SIM

CROSS-REFERENCE TO RELATED APPLICATION

This application claims the benefit of priority under 35 U.S.C. § 120 as a continuation of PCT Patent Application No. PCT/CN2020/107317, filed on Aug. 6, 2020, the disclosure of which is incorporated herein by reference in its entirety.

TECHNICAL FIELD

The disclosure relates generally to wireless communications and, more particularly, to systems and methods for detecting the paging of another Subscriber when one Subscriber is in a connected state.

BACKGROUND

The 3rd Generation Partnership Project (3GPP), which has developed the most successful standard technologies in the mobile communication market such as Universal Mobile Telecommunication System (UMTS) and Long Term Evolution (LTE), is currently carrying out the standardization of Fifth Generation (5G) mobile communication technology. Within 3GPP, Service and System Aspects Working Group 2 (SA2) is responsible for identifying the main functions and entities of the network.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one aspect, the present disclosure is directed to a method for detecting the paging for another subscriber (e.g., Subscriber2Network B) when one Subscriber (e.g., Subscriber1/Network A) is in a connected state. In some embodiments, the method includes configuring, by a wireless communication device, a first subscriber of the wireless communication device into a connected state with a first wireless communication node. In some embodiments, the method includes configuring, by the wireless communication device, a second subscriber of the wireless communication device into an idle state or an inactive state, wherein the second subscriber is associated with a second wireless communication node. In some embodiments, the method includes determining, by the wireless communication device, Multi-Subscriber Identification Module (SIM) assistance Information (MAI) that is associated with the second subscriber of the second wireless communication node. In some embodiments, the method includes transmitting, by the wireless communication device, the MAI to the first wireless communication node In another aspect, the present disclosure is directed to a method for detecting the paging of another Subscriber (e.g., Subscriber2/Network B) when one Subscriber (e.g., Subscriber1/Network A) is in a connected state. In some embodiments, the method includes configuring, by a wireless communication device, a first subscriber of the wireless communication device into a connected state with a first wireless communication node. In some embodiments, the method includes configuring, by the wireless communication device, a second subscriber of the wireless communication device into an inactive state or an idle state, wherein the second subscriber is associated with a second wireless communication node. In some embodiments, the method includes receiving, by the wireless communication device, a packet comprising a RAN or CN paging message for the second subscriber through the first wireless communication node.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 4 illustrates an example structure for UEAssistanceInformation message, in accordance with some embodiments of the present disclosure.

FIG. 5 illustrates an example structure for MultiSIMAssistance, in accordance with some embodiments of the present disclosure.

FIG. 6 illustrates an example structure for MultiSIMAssistance, in accordance with some embodiments of the present disclosure.

FIG. 8 illustrates an example structure for a HandoverPreparationInformation message, in accordance with some embodiments of the present disclosure.

FIG. 9 illustrates an example structure for a MultiSIMAssistance message, in accordance with some embodiments of the present disclosure.

FIG. 11 is a flow diagram depicting a method for detecting the paging of another Subscriber when one Subscriber is in a connected state, in accordance with some embodiments of the present disclosure.

DETAILED DESCRIPTION OF EXEMPLARY EMBODIMENTS

Figure 1:
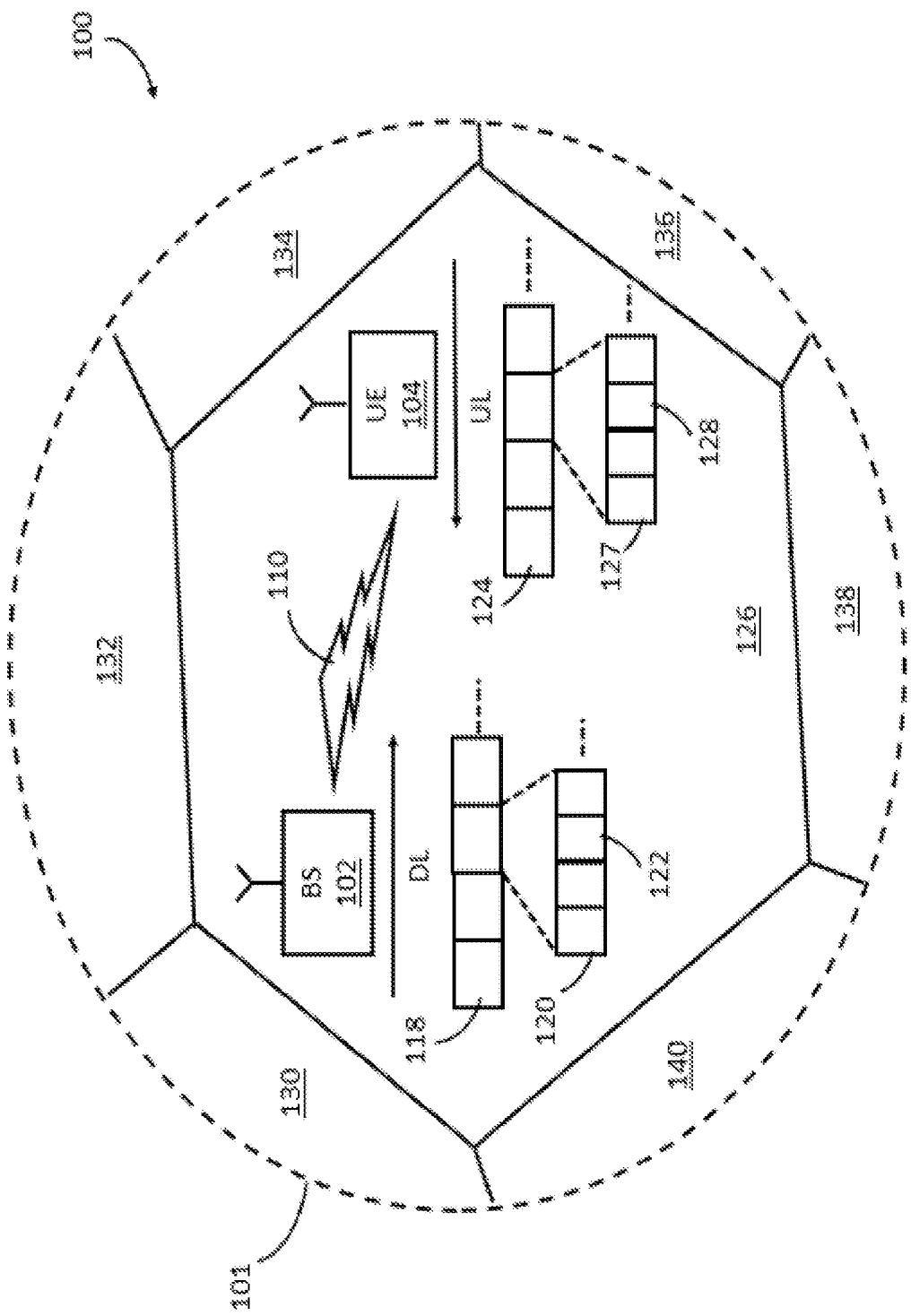
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

3GPP 3rd Generation Partnership Project
5G 5th Generation Mobile Networks
5G-AN 5G Access Network
5G gNB Next Generation NodeB
CCA Clean Channel Access
CCE Control Channel Element
CDRX Connected Mode Discontinuous Reception
CE Control Element
CG Configured Grant
COT Channel Occupancy Time
DCI Downlink Control Information
DG Dynamic Grant
DL Down Link or Downlink
DRX Discontinuous Reception Cycle
eMBB Enhanced Mobile Broadband
eNB Evolved Node B
ETSI European Telecommunications Standards Institute
LBT Listen Before Talk/Listen Before Send
LTE Long Term Evolution
MAC Medium Access Control
MAI Multi-SIM Assistance Information
MBMS Multimedia Broadcast Multicast Service
MBS Multicast and Broadcast Service
MSC Mobile Switching Center
NACK Negative Acknowledgement
NAS Non-Access Stratum
NR Next Generation RAN
OFDM Orthogonal Frequency-Division Multiplexing
OFDMA Orthogonal Frequency-Division Multiple Access
OSI Open Systems Interconnection
PDCP Packet Data Convergence Protocol
RAN Radio Access Network
RLC Radio Link Control
RNTI radio Network Temporary Identifier
RRC Radio Resource Control
RV Redundancy Version
SIM Subscriber Identification Module
TDM Time Division Mode
UE User Equipment
UL Up Link or Uplink According to recent discussions by the SA2, the core network (CN) paging of Subscriber 1 could be sent as an internet protocol (IP) packet of Network A. From the perspective of the radio access network (RAN) side, however, even if the core network (CN) paging was sent through an IP packet, the inactive UE (e.g., UE 104 in FIG. 1) still needs to detect the RAN paging and the Inactive/Idle UE still needs to detect the paging to check the system information modification and/or public warning system (PWS) message. That is, when the UE detects the RAN paging and/or the paging that is triggered by the system Information modification and/or PWS, the UE may need to ask (e.g., request, call, query) a time division mode (TDM) Gap from network A to receive the paging message (sometimes referred to as, "Paging Msg"). Thus, for a multi-SIM device, a mechanism is needed for detecting the paging of another Subscriber (e.g., Subscriber2/Network B) when one Subscriber (e.g., Subscriber1/Network A) is in a connected state.

Accordingly, the systems and methods discussed herein provide a mechanism for detecting the paging of another Subscriber (e.g., Subscriber2/Network B) when one Subscriber (e.g., Subscriber1/Network A) is in a connected state.

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
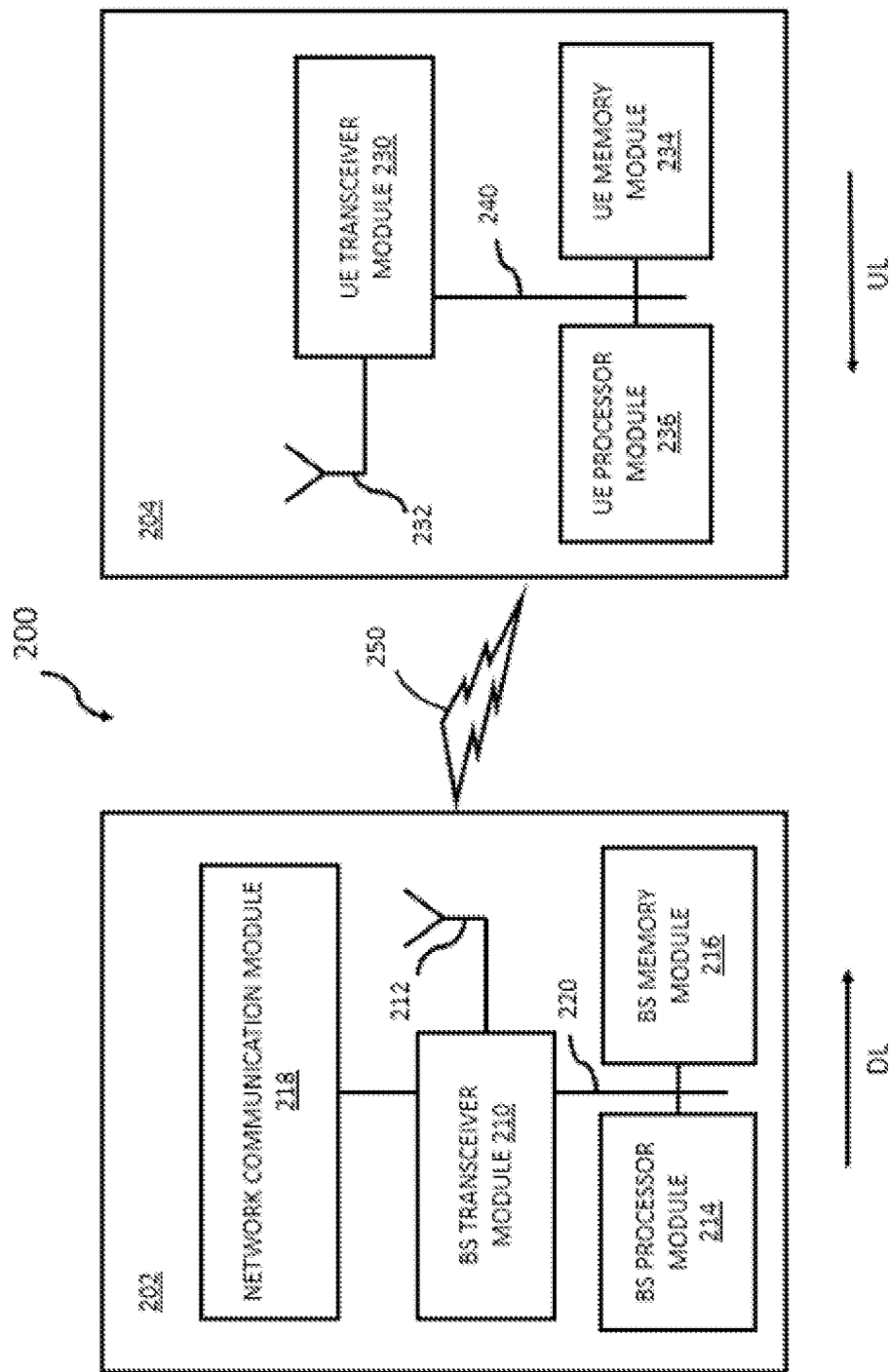
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232.

In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Exemplary Embodiment(s): Group 1

A network (e.g., BS 102 in FIG. 1), in some embodiments, may send RAN paging (sometimes referred to as, "a paging message") of the Subscriber2/Network B through an IP packet of the Subscriber1/Network A. For the paging that is triggered by the system Information modification and/or PWS, the UE (e.g., UE 104 in FIG. 1) can monitor (e.g., detect, observe, etc.) the paging in any paging occasion at least once in one modification period.

In some embodiments, for the RAN paging, a UE (non-access stratum) NAS indicates the application service (AS) that CN paging and/or RAN paging was sent through an IP packet. In some embodiments, the AS does not detect the CN/RAN paging. In some embodiments, once the RAN paging is triggered at the network side, the gNB (e.g., BS 102 in FIG. 1) may send paging related information to the CN (e.g., the RAN paging info can be a container which includes the ASN.1 encoded Paging Msg), then the CN may send it as an IP packet through the other network (e.g., under which the UE is at the connected state). In some embodiments, at the UE side, the upper layer (e.g., Application layer or the NAS layer) may indicate (e.g., transmit, notify, send, etc.) the paging to the AS. In some embodiments, the AS may process the paging that it receives via the Air Interface.

Figure 3:
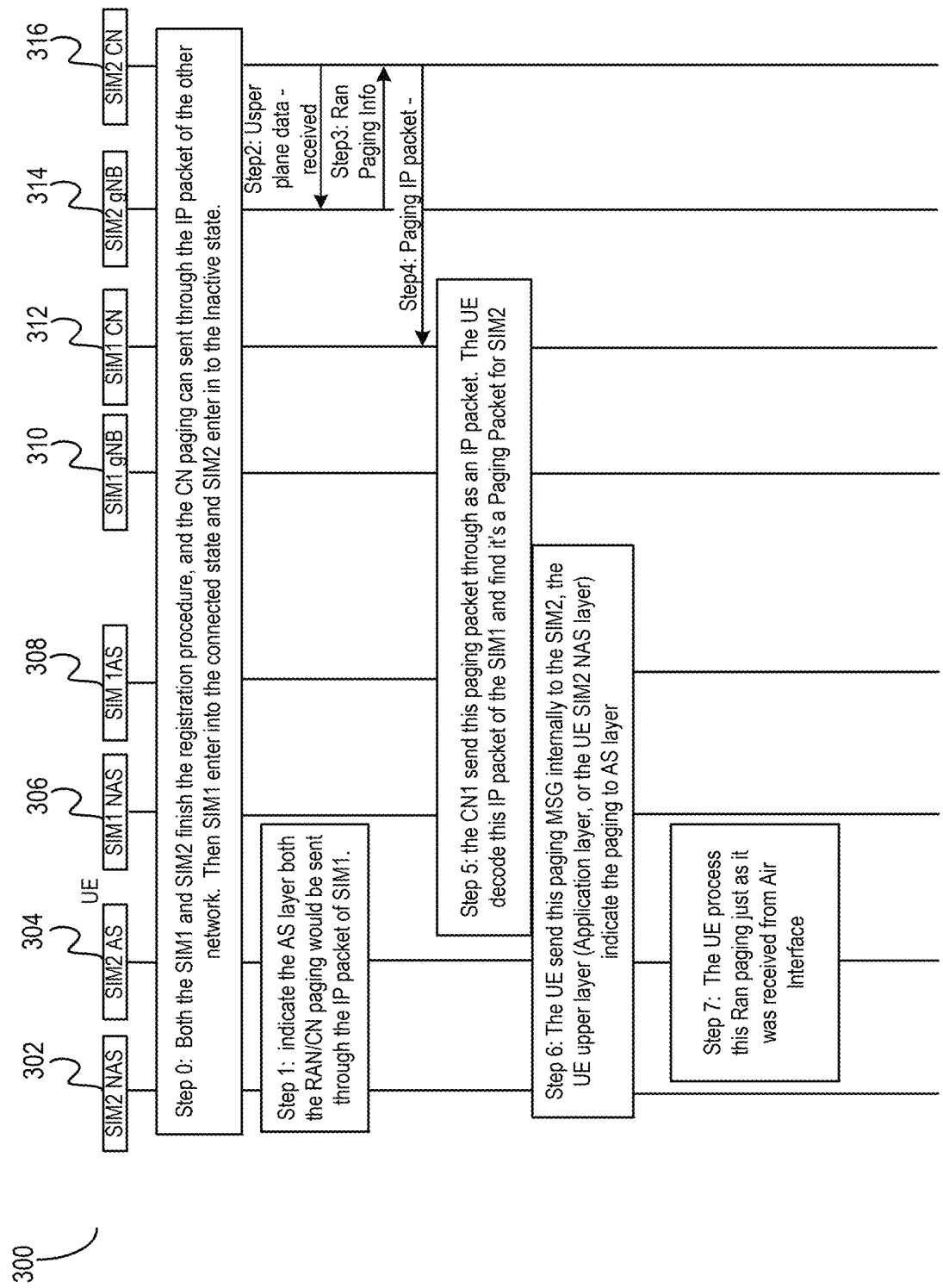
FIG. 3 illustrates a timing diagram of an example paging procedure, in accordance with some embodiments of the present disclosure.

FIG. 3 illustrates a timing diagram of an example paging procedure, in accordance with some embodiments of the present disclosure. The timing diagram 300 includes a Subscrber2 NAS 302, a Subscrber2 AS 304, a Subscrber1 NAS 306, a Subscrber1 AS 308, a Subscrber1 gNB 310, a Subscrber1 CN 312, a Subscrber2 gNB 314, and/or a Subscrber2 CN 316.

At step 0, in some embodiments, the Subscriber1 and/or the Subscriber2 finish the registration procedure, and the CN paging can sent through the IP packet of the other network. In some embodiments, the Subscriber1 enters into the connected state and/or the Subscriber2 enters into the inactive state. The subscriber can be a SIM/USIM(Universal Subscriber Identity Module)/eSIM(Embedded-SIM)/iSIM (IP Multimedia Subsystem-SIM) or the subscriber with the subscription data saved in a separate entity.

At step 1, in some embodiments, the NAS layer of the Subscriber2 (shown in FIG. 3 as, "Subscriber2 NAS 302") may indicate the AS layer of Subscriber2 (shown in FIG. 3 as, "Subscriber2 AS 304") that the RAN/CN paging will be sent through the IP packet of the Subscriber1, then the AS layer of Subscriber 2 may stop monitoring the Ran/CN paging from the air interface.

At step 2, in some embodiments, at the network side, the gNB2 (shown in FIG. 3 as, "Subscriber2 gNB 314") triggers the RAN paging responsive to receiving the user plane data. In some embodiments, the UE is at the inactive state of the AS layer and/or the UE is at the CN-connected state of the CN layer.

At step 3, in some embodiments, the gNB2 sends the RAN paging information to the CN2 (shown in FIG. 3 as, "Subscriber2 CN 316"). In some embodiments, the RAN paging info can be a container which includes the ASN.1 encoded Paging Msg.

At step 4, in some embodiments, the CN2 of the Subscriber2 sends the paging as an IP packet to the CN of the Subscriber1 (shown in FIG. 3 as, "Subscriber2 CN 312").

At step 5, in some embodiments, the CN1 sends the paging packet as an IP packet. In some embodiments, the UE decodes (e.g., translates, interprets, decrypts, etc.) the IP packet and/or determines (e.g., identifies, etc.) that the paging packet is for the Subscriber2.

At step 6, in some embodiments, the UE sends the Paging Msg internally to the Subscriber2 and/or the UE upper layer (e.g., Application layer, NAS layer) may indicate the paging to the AS layer. In some embodiments, the UE upper layer may be an application layer (shown in FIG. 3 as, "Subscriber2 AS 304") or a NAS layer (shown in FIG. 3 as, "Subscriber2 NAS 302").

At step 7, in some embodiments, the UE may process this RAN paging just as it was received from the Air Interface.

In some embodiments, the second core network (corresponding to the CN of the second subscriber) indicates the second wireless communication node in a Ng/S1 message that it supports to send Ran Paging through an IP packet of the first network, in which, the Ng interface is between RAN and SGC, while the S1 interface is between RAN and EPC. The Ng/S1 interface message can be an NgSetup/S1Setup message or an initialcontextsetup message.

In some embodiments, the Ran paging is triggered by the second wireless communication node when data from the second core network node arrived.

In some embodiments, the second wireless communication node indicates the second core network node the Ran paging message in an Ng/S1 message. The Ran paging message includes the Inactive RNTI (Radio Network Temporary Identity), which indicates the inactive state Identity of the wireless communication device. The Ran paging message can be included in a container of the Ng/S1 message In some embodiments, the second core network send the ran paging to the first core network of the firs subscriber, and the first core network send this IP packet to the first wireless communication node, and the first wireless communication node send this IP packet to the wireless communication device.

In some embodiments, this method can also be applied for the CN paging for the second subscriber when it was sent through the first network as an IP packet.

In some embodiments, for the paging that was triggered by the system information modification and/or PWS, the UE can check any of the paging occasion (PO) at least once in one system information modification period at idle state and/or inactive state. In some embodiments, the UE can determine how to select the PO.

3. Exemplary Embodiment(s): Group 2

As discussed in the embodiments below, the UE can negotiate the TDM Gap from network A to receive the Paging Msg. While the following embodiments relate to the assistance information, the UE may instead use a new RRC message to request the TDM Gap and/or to define a new response message for this request.

3.1 Exemplary Embodiment(s): Multi-SIM Assistance Information (MAI) Configuration In some embodiments, the UE can inform the Multi-SIM assistance Information (MAI) of second subscriber to the wireless communication node of the first network. For example, FIG. 4 illustrates an example structure for UEAssistanceInformation message, in accordance with some embodiments of the present disclosure.

In some embodiments (sometimes referred to as, "Option 1"), the preferred DRX cycle may be indicated. That is, the UE may determine the preferred DRX cycle based on the Subscriber2 Paging occasion. For example, FIG. 5 illustrates an example structure for Multi SIMAssistance, in accordance with some embodiments of the present disclosure.

In some embodiments (sometimes referred to as, "Option 2"), the UE indicates the sfn-offset/frameBoundaryOffset between the network 1 and network 2, and the TDM gap or PO start SFN/FN/symbol, the TDM gap or PO duration, the TDM gap or PO period, and or the SCS. In some embodiments, the start frame number, the start sub-frame number, the start symbol, the duration, the period, and/or the SCS may be based on the configuration of the second network or second wireless communication node.

As another example, FIG. 6 illustrates an example structure for MultiSIMAssistance, in accordance with some embodiments of the present disclosure.

3.2 Exemplary Embodiment(s): Determining When and/or How to Indicate MAI

In some embodiments, the UE and/or the network (e.g., network A, network 1, BS 102 in FIG. 1) may need to determine when the UE should indicate the assistance information and/or how to send the assistance information. In some embodiments, the UE indicates the assistance information when the UE needs the TDM Gap to monitor paging and/or the other Subscriber is at active state.

Figure 7:
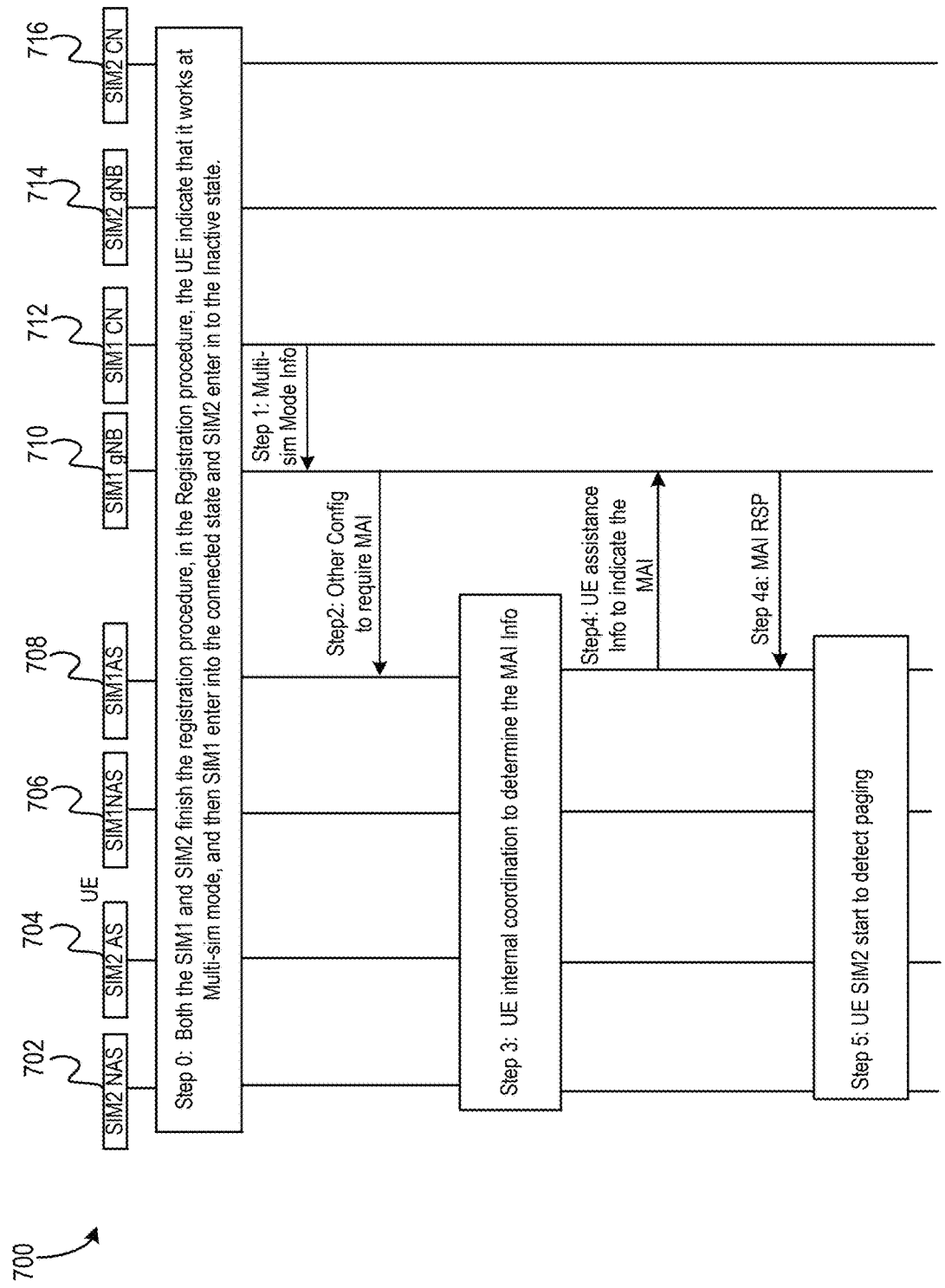
FIG. 7 illustrates a timing diagram of an example paging procedure, in accordance with some embodiments of the present disclosure.

FIG. 7 illustrates a timing diagram of an example paging procedure, in accordance with some embodiments of the present disclosure. The timing diagram 700 includes a Subscriber2 NAS 702, a Subscriber2 AS 704, a Subscriber1 NAS 706, a Subscriber1 AS 708, a Subscriber1 gNB 710, a Subscriber1 CN 712, a Subscriber2 gNB 714, and/or a Subscriber2 CN 716.

At step 0, in some embodiments, the UE can indicate it is working at the Multi-SIM card mode during the registration procedure by a NAS message and/or an AS message.

At step 1, in some embodiments, if by the NAS message, the CN can indicate the Multi-SIM info to the gNB.

At step 2, in some embodiments, the gNB can ask (e.g., request, query, etc.) the UE to report the Multi-SIM assistance information by the indication "MultiSimConfig" in the "otherconfig" element in the RRCConnection Reconfiguration Msg.

At step 3, in some embodiments, the UE determines (e.g., decides, defines, etc.) the MAI info by internal coordination.

At step 4, in some embodiments, the UE reports the MAI in the UE assistance information Msg.

At step 5, in some embodiments, the UE can start (e.g., trigger, initiate, begin, etc.) the Subscriber2 paging monitoring with or without waiting for a response message (sometimes referred to as, "Response Msg"), as in step 4. In some embodiments, if the Network 1 want to modify (e.g., adjust, change, alter, etc.) the TDM Gap, it can also indicate the modified TDM Gap in the Response Msg as in step 4.

In some embodiments, the second Subscriber of the wireless communication device can start detecting with or without receiving the response from the first wireless communication node. The response from the first wireless communication node is triggered after the first wireless communication node receiving the MAI. The first wireless communication node can include a TDM Gap information that reserved for the second subscriber in the response message and the Subscriber 2 should take the TDM Gap information into consideration when detecting paging on the second wireless communication network node.

3.3 Exemplary Embodiment(s): Impact of a Change in MAI

When the assistance information changed, how does the UE report to the network? In some embodiments, when the MAI information changed (e.g., a system information change that affects the MAI, a beam change that affects the MAI, or the UE Subscriber2 reselect to other Cell), then the UE can send the corresponding UE assistance information again (e.g., repeats, twice, etc.) to indicate the new MAI. In some embodiments, the UE may use a delta configuration method.

3.4 Exemplary Embodiment(s): Indicating MAI During a Connected State

How does the source gNB indicate the target gNB with the MAI during the connected state mobility? In some embodiments, when the UE moves (e.g., transitions, etc.) from the gNB1 to the gNB2 under the network A of Subscriber1, the UE may indicate the Multi-SIM assistance information from the gNB1 to the gNB2 through the Xn or Ng interface. In some embodiments, the gNB2 may take the Multi-SIM assistance into consideration. In some embodiments, the Multi-SIM assistance information may be sent through the central unit (CU) to the distribution unit (DU) for the DU to reserve the TDM Gap.

FIG. 8 illustrates an example structure for a Handover-PreparationInformation message, in accordance with some embodiments of the present disclosure. In some embodiments, the Xn interface may be included in the Handover-PreparationInformation message. In some embodiments, the Ng interface may be included in the "Source to Target Transparent Container" of the "HANDOVER REQUIRED' Msg.

3.4 Exemplary Embodiment(s): Determining When and/or How to Indicate MAI

In some embodiments, for the Dual Rx, the UE can split (e.g., divided, separated, partitioned, etc.) part of PHY/RF resources to detect paging on Subscriber2. In some embodiments (sometimes referred to as, "Option A"), the UE reserves (e.g., allocates, assigns, etc.) part of a RF/PHY resource for the Paging receiving. In some embodiments, the UE may have 2 UE capability sets, one for the single SIM card mode and one for the Multiple-SIM mode.

In some embodiments (sometimes referred to as, "Option B"), the UE reserves part of a RF/PHY resource for the Paging receiving only during the TDM Gap. In some embodiments, the UE sends the TDM gap related info (as discussed herein) of Subscriber2 and/or reduced capability to the network A of Subscriber1. In some embodiments, the Network A may take this reduced capability into consideration, especially for the TDM Gap.

In some embodiments, the MAI information may include the reduced cap info and/or the requested TDM gap information. For example, FIG. 9 illustrates an example structure for a Multi SIMAssistance message, in accordance with some embodiments of the present disclosure.

4. Methods for Implementing Exemplary Embodiments From Groups 1-2

Figure 10:
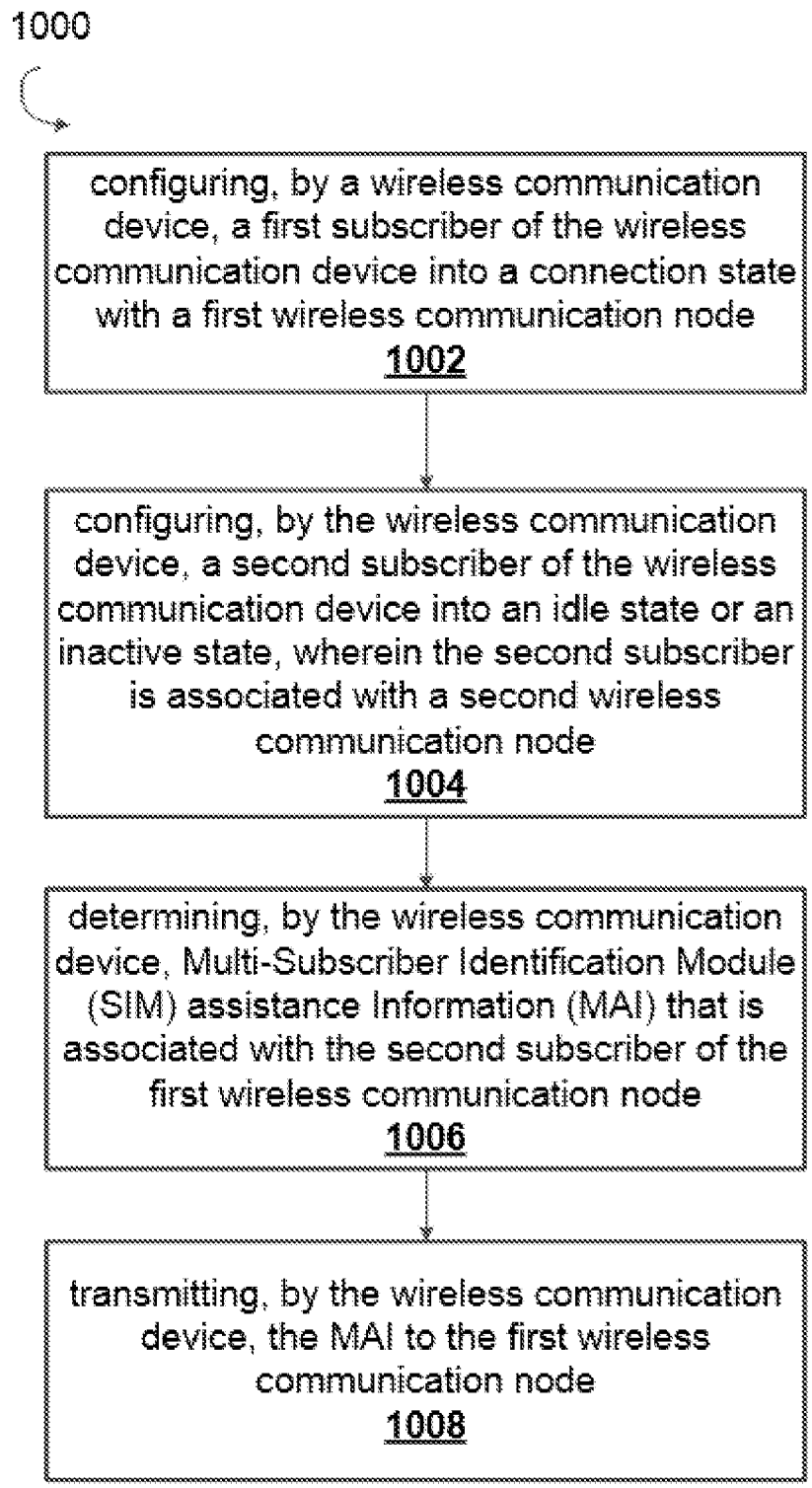
FIG. 10 is a flow diagram depicting a method for detecting the paging of another Subscriber when one Subscriber is in a connected state, in accordance with some embodiments of the present disclosure.

FIG. 10 is a flow diagram depicting a method for detecting the paging of another Subscriber (e.g., Subscriber2/Network B) when one Subscriber (e.g., Subscriber1/Network A) is in a connected state, in accordance with some embodiments of the present disclosure. Additional, fewer, or different operations may be performed in the method depending on the particular embodiment. In some embodiments, some or all operations of method 1000 may be performed by a wireless communication node, such as BS 102 in FIG. 1. In some operations, some or all operations of method 1000 may be performed by a wireless communication device, such as UE 104 in FIG. 1. Each operation may be re-ordered, added, removed, or repeated.

As shown, the method 1000 includes, in some embodiments, the operation 1002 of configuring, by a wireless communication device, a first subscriber of the wireless communication device into a connection state with a first wireless communication node. The method includes, in some embodiments, the operation 1004 of configuring, by the wireless communication device, a second subscriber of the wireless communication device into an idle state or an inactive state, wherein the second subscriber is associated with a second wireless communication node. The method includes, in some embodiments, the operation 1006 of determining, by the wireless communication device, Multi-Subscriber Identification Module (SIM) assistance Information (MAI) that is associated with the second subscriber of the first wireless communication node. The method includes, in some embodiments, the operation 1008 of transmitting, by the wireless communication device, the MAI to the first wireless communication node.

FIG. 11 is a flow diagram depicting a method for detecting the paging of another Subscriber (e.g., Subscriber2Network B) when one Subscriber (e.g., Subscriber1/Network A) is in a connected state, in accordance with some embodiments of the present disclosure. Additional, fewer, or different operations may be performed in the method depending on the particular embodiment. In some embodiments, some or all operations of method 1100 may be performed by a wireless communication node, such as BS 102 in FIG. 1. In some operations, some or all operations of method 1100 may be performed by a wireless communication device, such as UE 104 in FIG. 1. Each operation may be re-ordered, added, removed, or repeated.

As shown, the method 1100 includes, in some embodiments, the operation 1102 of configuring, by a wireless communication device, a first subscriber of the wireless communication device into a connection state with a first wireless communication node. The method includes, in some embodiments, the operation 1104 of configuring, by the wireless communication device, a second subscriber of the wireless communication device into an inactive state or an idle state, wherein the second subscriber is associated with a second wireless communication node. The method includes, in some embodiments, the operation 1106 of receiving, by the wireless communication device, a packet comprising a paging message for the second subscriber through the first wireless communication node.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
    configuring, by a wireless communication device, a first subscriber of the wireless communication device into a connection state with a first wireless communication node;
    determining, by the wireless communication device, time division mode (TDM) Gap information relating to a TDM gap for detecting paging of a second subscriber, the TDM Gap information corresponding to at least one of: a start frame number, a start sub-frame number, a start symbol, a duration, or a period; and
    transmitting, by the wireless communication device, the TDM Gap information to the first wireless communication node, wherein
    the TDM Gap information is indicated by the first wireless communication node to a second wireless communication node through an Xn interface or an interface between a centralized unit (CU) and a distributed unit (DU).

2. The method of claim 1, wherein the TDM Gap information is included in a Multi-Subscriber Identification Module (SIM) Assistance Information (MAI).

3. The method of claim 1, further comprising:
    transmitting, by the wireless communication device, an indication of TDM Gap information capability indicating that the wireless communication device supports providing TDM Gap Information.

4. The method of claim 1, further comprising:
    receiving, by the wireless communication device, a request message from the first wireless communication node to the first subscriber to report the TDM Gap information; and
    transmitting, by the wireless communication device responsive to receiving the request message to report the TDM Gap Information, an indication of the TDM Gap information.

5. The method of claim 1, further comprising:
    determining, by the wireless communication device, a change in the TDM Gap information; and
    transmitting, by the wireless communication device responsive to determining the change in the TDM Gap information, an indication of a second TDM Gap information.

6. The method of claim 5, wherein the wireless communication device utilizes a delta configuration method.

7. The method of claim 5, wherein the wireless communication device utilizes an index to identify the TDM Gap information.

8. The method of claim 1, wherein the TDM Gap information is reserved for a second subscriber in a response message.

9. The method of Claim 1, wherein the indication of TDM Gap information capability comprises a reduced capability information associated with the wireless communication device, wherein the wireless communication device comprises a dual receiver.

10. The method of claim 9, further comprising:
transmitting, by the wireless communication device, an indication of the reduced capability information in a radio resource control (RRC) message or a non-access stratum (NAS) message.

11. The method of claim 1, further comprising:
receiving, by the wireless communication device from the first wireless communication node, TDM gap information reserved for the second subscriber.

12. A wireless communication device, comprising:
at least one processor configured to:
 configure a first subscriber of the wireless communication device into a connection state with a first wireless communication node;
 determine, time division mode (TDM) Gap information relating to a TDM gap for detecting paging of a second subscriber, the TDM Gap information corresponding to at least one of: a start frame number, a start sub-frame number, a start symbol, a duration, or a period; and
 transmit, via a transmitter, the TDM Gap information to the first wireless communication node, wherein
 the TDM Gap information is indicated by the first wireless communication node to a second wireless communication node through an Xn interface or an interface between a centralized unit (CU) and a distributed unit (DU).

13. A method comprising:
receiving, by a first wireless communication node from a wireless communication device, time division mode (TDM) Gap information relating to a TDM gap for detecting paging of a second subscriber, wherein the wireless communication device configures a first subscriber of the wireless communication device into a connection state with the first wireless communication node, wherein the TDM Gap information corresponds to at least one of: a start frame number, a start sub-frame number, a start symbol, a duration, or a period, and communicating, by the first wireless communication node through an Xn interface or an interface between a centralized unit (CU) and a distributed unit (DU), the TDM Gap information to a second wireless communication node.

14. A first wireless communication node comprising:
at least one processor configured to:
receive, via a receiver from a wireless communication device, time division mode (TDM) Gap information relating to a TDM gap for detecting paging of a second subscriber, wherein the wireless communication device configures a first subscriber of the wireless communication device into a connection state with the first wireless communication node, wherein the TDM Gap information corresponds to at least one of: a start frame number, a start sub-frame number, a start symbol, a duration, or a period; and transmit, via a transmitter, through an Xn interface or an interface between a centralized unit (CU) and a distributed unit (DU), the TDM Gap information to a second wireless communication node.

* * * * *